No. 855,167. PATENTED MAY 28, 1907.
G. B. ESSEX.
MULTIPLE SIGHT FEED OILER.
APPLICATION FILED OCT. 9, 1905.
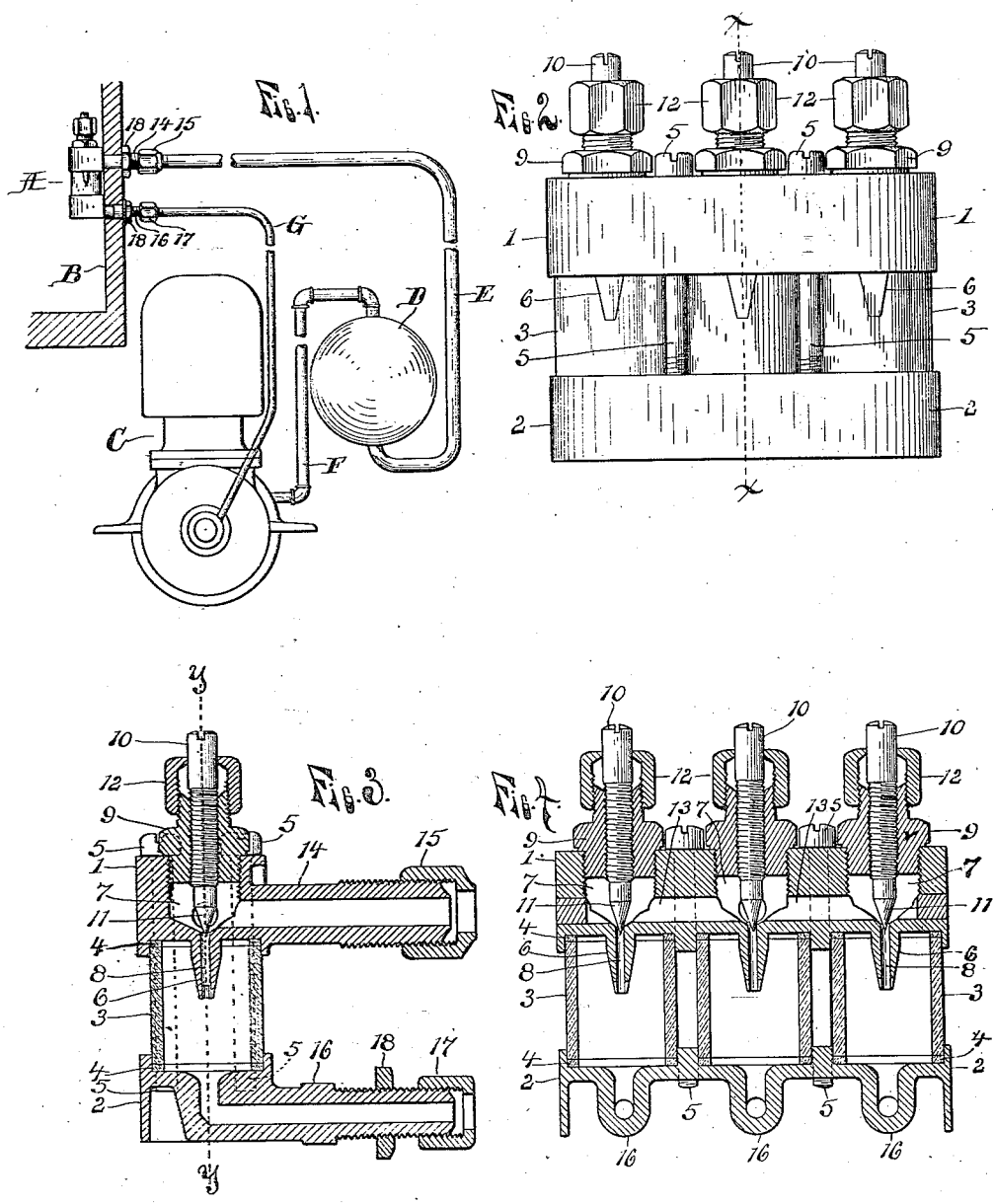
WITNESSES:
Lewis E. Flanders
Oliver E. Barthel
INVENTOR.
George B. Essex
BY
ATTORNEYS.

UNITED STATES PATENT OFFICE.

GEORGE B. ESSEX, OF DETROIT, MICHIGAN.

MULTIPLE SIGHT-FEED OILER.

No. 855,167.  Specification of Letters Patent.  Patented May 28, 1907.

Application filed October 9, 1905. Serial No. 281,897.

*To all whom it may concern:*

Be it known that I, GEORGE B. ESSEX, a citizen of the United States of America, residing at Detroit, in the county of Wayne and State of Michigan, have invented certain new and useful Improvements in Multiple Sight-Feed Oilers, of which the following is a specification, reference being had therein to the accompanying drawings.

This invention relates to improvements in lubricators and more especially to that class of lubricators known as multiple sight-feed oilers, and its object is to provide a lubricator of this class which is so constructed as to be especially adapted for use upon automobiles provided with explosive engines and is so connected and arranged as to be automatic in its operation, the flow of oil being controlled by the engine. It is also an object of the invention to so construct the device that any leakage around the sight tubes may be quickly and easily remedied and so as to especially adapt the sight-feed to be readily attached to the dash-board or similar part of the vehicle in such a manner as to conceal the pipes and connections leading thereto.

A further object of the invention is to provide a very simple, compact and efficient device presenting a neat appearance and embodying certain other new and useful features in its construction, arrangement and combination of parts, all as hereinafter more fully described, reference being had to the accompanying drawings, in which Figure 1, is a view illustrating the manner in which the sight-feed and its supply tank are connected with each other and with the engine; Fig. 2, is a front elevation of the sight-feed; Fig. 3, a transverse vertical section of the same on the line $x$—$x$ of Fig. 2; and Fig. 4, a vertical section on the line $y$—$y$ of Fig. 3.

As shown in Fig. 1, A is the multiple sight-feed shown secured to the dash-board B or similar part of the automobile. C represents the engine and D the oil supply tank which is connected to the sight-feed by a supply pipe E and with the crank case of the engine by a pipe F, said pipe F leading from the crank case to the top of the tank so that when the engine is running the air compressed in the crank case by the engine piston will be forced through the pipe into the oil tank and put a pressure on the oil which will thus be forced up through the supply pipe to the sight-feed, from which is passes into the tubes G leading to the several bearings or parts to be lubricated.

When the engine is stopped the pressure in the oil tank falls at once, thus stopping the flow of oil therefrom to the sight-feed, but in order to prevent the oil contained in the sight-feed and adjacent end of the supply pipe from passing on and flooding the bearings, I make the supply pipe of a comparatively large diameter so that its capacity is greater than that of the passage in the sight-feed and locate the tank some distance from and below the sight-feed, preferably near the engine cylinder where it will be kept warm, and therefore when the pressure is taken from the oil in the tank, the weight of the body of oil then contained in the supply pipe will cause the oil to flow rapidly back toward the tank and thus form a suction which will draw all of the oil from the said passage and at once stop the flow to the bearings.

The sight-feed A consists of an upper cast head 1 and a lower cast head 2 each formed with a series of sockets to receive the ends of glass feed tubes 3 with packing rings 4 interposed between the ends of said tubes and the bottoms of the sockets, and screw-bolts 5 extending through openings in the upper head between the tubes, engage screw-threaded openings in the lower head and draw said heads toward each other to firmly clamp the tubes between.

Feed nipples 6 formed integral with the head 1, project downward therefrom in the axis of each sight-tube, and opposite each nipple the head is bored inward from the upper side to form a chamber 7 and said nipples are bored vertically to form discharge ducts 8 leading from said chambers. Each of the chambers 7 is closed by a valve fitting 9 screwed into its upper end, and through each fitting passes a screw-threaded stem 10 having a needle point 11 at its lower end to project into the upper end of the duct 8 and control the flow of oil therethrough. Each fitting is also provided with a packing nut 12 on its outer end through which its valve stem projects to prevent leakage around the same. These chambers 7 communicate with each other through a passage 13 formed by boring longitudinally through the head and then plugging the ends of the bore, and this passage and the chambers are supplied with oil through a stem 14 formed integral with the head and extending horizontally outward from its rear side. This stem is externally screw-threaded and provided with a coupling nut 15 for securing the end of the supply pipe E thereto.

The lower head 2 is formed with horizontally extending stems 16, one for each sight-tube, extending rearwardly from the head and externally screw-threaded to receive a coupling nut 17 by means of which the tubes G are secured thereto and also to receive a binding nut 18 adapted to engage the rear side of the dash-board B, which is provided with a series of holes to receive the stems, and securely clamp the heads against the face of said dash. The lower head is bored vertically downward in the axis of each sight-tube to meet the bores of the stems 16 and form the discharge passages from the sight-feed, and a downwardly extending flange or apron is provided along the front and ends of the lower head to form a finish and hide the stems. A binding or securing nut 18 may also be provided on the stem 14 which also extends through an opening in the dash, to further secure the sight-feed in place, and instead of boring out the chambers 7 in the upper head and screwing in the fittings 9, the head may be cored out and said fittings formed integral with the head.

By forming the heads with the stems which project laterally therefrom through the dash and form the means for securing the sight-feed to the dash, said feed is firmly held and all pipes, tubes, and connections are concealed by the dash, making a very neat and cheap construction; and by making two separate heads with recesses to receive the sight-tubes and drawing these heads into contact with the packing by bolts, a very simple and practical construction is secured as any inaccuracy in the heads or tubes is compensated for by the packing and the forcing of the heads into firmer contact therewith, and as the construction is such that any person however unskilled will readily see that by tightening the screw bolts leakage will be stopped.

Having thus fully described my invention, what I claim is:—

1. The combination of a sight-feed having a series of sight-glasses and discharge passages leading therefrom, a series of externally screw-threaded stems forming a continuation of said passages and extending laterally from the sight-feed to project through openings in a dash-board or similar support, tubes connected to the ends of said stems, and nuts on the stems to engage the dash-board and secure the sight-feed thereto.

2. The combination of a head having a longitudinal oil passage, a stem formed integral with said head and extending laterally therefrom and provided with a passage communicating with the passage in the head, a supply pipe connected to said stem, a lower head provided with discharge passages, a series of sight-tubes interposed between said heads, a series of stems formed integral with the lower head and extending laterally therefrom with passages communicating with the discharge passages, tubes secured to the ends of said screws or stems, and means on said stems for securing the same within openings in a dash-board with the heads in contact with the face of said board.

3. The combination of a head formed with a longitudinal passage for oil and with ducts leading from said passage for the discharge of the oil therefrom, a series of needle valves to control the flow of oil through said ducts, an externally screw-threaded stem formed integral with said head with a passage communicating with the passage therein and extending laterally from the rear side of said head, a lower head formed with a series of discharge passages, sight-tubes interposed between said heads, a series of stems formed integral with the lower head with passages communicating with the discharge passages and extending laterally from the rear side of the head, there being a downwardly extending flange on the front side of said lower head.

4. The combination of a head formed with chambers and a longitudinal passage connecting said chambers and recesses in its lower side, a series of nipples extending downward from the lower side of the head in the axis of said recesses and provided with ducts communicating with the chambers, valve fittings screwed into the upper ends of said chambers, valve stems extending through said fittings and provided with needle points to engage the said ducts, a stem formed integral with said head and extended laterally from the rear side thereof, a lower head formed with a series of recesses and discharge passages leading from the axes of said recesses, sight-tubes engaging the recesses in said heads, externally screw-threaded stems having passages communicating with the discharge passages and extending laterally from the rear side of said lower head, nuts on said stems, there being a flange extending downward from said lower head at the front side thereof.

In testimony whereof I affix my signature in presence of two witnesses.

GEORGE B. ESSEX.

Witnesses:
OLIVER E. BARTHEL,
OTTO F. BARTHEL.